(12) United States Patent
Cideciyan et al.

(10) Patent No.: US 8,259,405 B2
(45) Date of Patent: Sep. 4, 2012

(54) REWRITING CODEWORD OBJECTS TO MAGNETIC DATA TAPE UPON DETECTION OF AN ERROR

(75) Inventors: Roy D. Cideciyan, Rueschlikon (CH);
Thomas Mittelholzer, Zurich (CH);
Paul J. Seger, Tucson, AZ (US);
Keisuke Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 12/351,756

(22) Filed: Jan. 9, 2009

(65) Prior Publication Data

US 2010/0177420 A1 Jul. 15, 2010

(51) Int. Cl.
*G11B 20/16* (2006.01)
(52) U.S. Cl. .......................................... 360/40
(58) Field of Classification Search ............... 360/40, 360/39, 48, 53, 77.12, 78.03; 341/59; 714/771
See application file for complete search history.

(56) References Cited

U.S. PATENT DOCUMENTS

| | | | | |
|---|---|---|---|---|
| 5,969,649 | A * | 10/1999 | Ashley et al. | 341/59 |
| 6,381,706 | B1 | 4/2002 | Zaczek | |
| 7,046,464 | B2 | 8/2003 | Hirose | |
| 7,432,834 | B1 * | 10/2008 | Cideciyan et al. | 341/59 |
| 7,679,535 | B2 | 3/2010 | Cideciyan | |
| 2010/0177422 | A1 * | 7/2010 | Cideciyan et al. | 360/40 |
| 2010/0180180 | A1 * | 7/2010 | Cideciyan et al. | 714/771 |

FOREIGN PATENT DOCUMENTS

| | | |
|---|---|---|
| EP | 1 267 349 A1 | 12/2002 |
| WO | 00/23998 A1 | 4/2000 |
| WO | 2008/138707 A1 | 11/2008 |

OTHER PUBLICATIONS

Standard ECMA-319: Data Interchange on 12,7 mm 384-Track Magnetic Tape Cartridges—Ultriunn-1 Format; Jun. 2001; (http://www.ecma-international.org/publications/files/ecma-st/ecma-319.pd>); pp. 57-85.
Jaquette, Lto: A Better Format for Mid-Range Tape; IBM Journal of Research and Development, International Business Machines Corporation, New York, NY, US; vol. 47, No. 4, Jul. 1, 2003; pp. 429-444.

* cited by examiner

*Primary Examiner* — Fred Tzeng
(74) *Attorney, Agent, or Firm* — Dan Shifrin

(57) ABSTRACT

During a read-after-write operation on magnetic tape, a first SCO is formed which includes two encoded processed user data units and is one of T SCOs in a first SCO set. The user data units are each one of T user data units in first and second user data unit sets, respectively, within the first SCO set. The first SCO set is written to the magnetic tape and is immediately read. When an error is detected in one of the user data units, a second SCO is formed to include the first user data unit and, only if an error is not detected in a user data unit in the other user data unit set, to not include the other user data unit, the second SCO being one of T SCOs in a second SCO set. Then, the second SCO set is rewritten to a later position on the tape later.

32 Claims, 7 Drawing Sheets

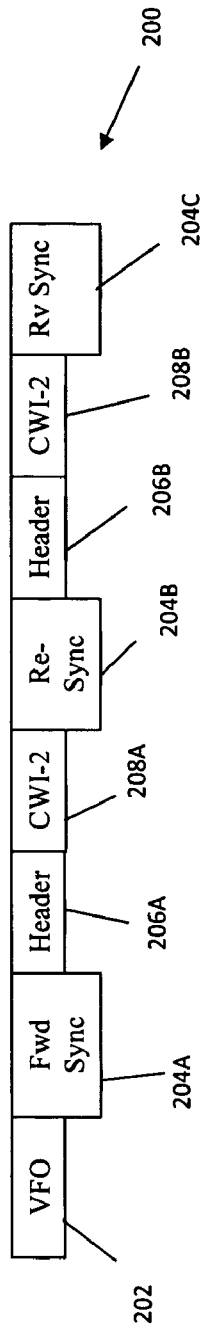
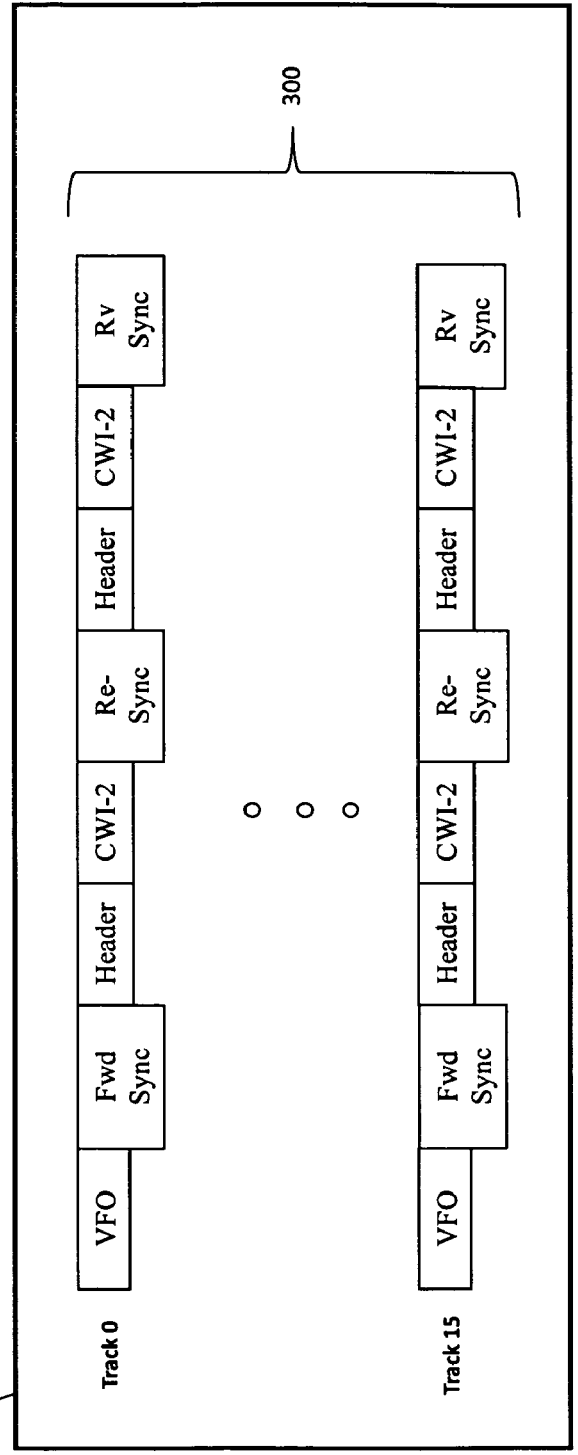
FIG. 2
(Prior Art)
FIG. 3A
(Prior Art)

and co-pending U.S. application Ser. No. 12/351,738, entitled
REWRITING CODEWORD OBJECTS TO MAGNETIC DATA TAPE UPON DETECTION OF AN ERROR

RELATED APPLICATION DATA

The present application is related to commonly-assigned and co-pending U.S. application Ser. No. 12/351,738, entitled ECC INTERLEAVING FOR MULTI-TRACK RECORDING ON MAGNETIC TAPE and commonly-assigned U.S. Pat. No. 7,876,516, entitled REWRITE-EFFICIENT ECC/INTERLEAVING FOR MULTI-TRACK RECORDING ON MAGNETIC TAPE, both filed on the same date as the present application, which related application and patent are hereby incorporated herein by reference in their entireties.

TECHNICAL FIELD

The present invention relates generally to writing data to magnetic tape and, in particular, to rewriting data in the event an error is detected in the originally written data.

BACKGROUND ART

In the Linear Tape Open (LTO) tape drives, data packets (each of which includes a block of data and related overhead) are written on tape tracks in structures known as synchronized codeword objects (SCO). SCOs consist of two encoded data units, each with an associated header, and added synchronization patterns. The encoded data unit consists of m interleaved Reed-Solomon codewords, designated by the term Codeword Interleave-m ("CWI-m"). In LTO generations 1 to 4, m=2 and SCOs consist of two CWI-2s with the associated headers and added synchronization patterns. In LTO, a structure of two CWI-m's with the associated headers is referred to as a codeword object ("CO"). In LTO-1 to LTO-4, the minimum unit that can be written is a set of T COs, where T is the number of physical tracks on the tape that are written simultaneously.

During magnetic tape recording, errors may be detected by using a read-while-write process in which data is read and verified immediately after being written. If an error is detected, the tape drive rewrites the same data to ensure that at least one correct instance of the data exists on the tape. In the LTO 1-4 standard, because the minimum unit that can be written is a CO set, the minimum unit that can be rewritten is also a CO set. In future LTO generations, format efficiency will be improved by increasing the length of the codeword object. However, the penalty for rewriting codeword objects will increase in a corresponding manner.

For example, in a tape cartridge having an actual capacity of 1680 GB, an average of 5% of the capacity, or approximately 80 GB, may be reserved for rewriting CWI-2s, resulting in a nominal (useful) capacity of 1600 GB. If the number of SCOs which are rewritten remains the same, the space needed for the rewrites doubles to approximately 160 GB, reducing the nominal capacity of the cartridge by approximately another 80 GB to 1680−160=1520 GB. Such a loss in cartridge capacity is significant.

SUMMARY OF THE INVENTION

Method and apparatus are provided for rewriting data to magnetic tape when an error is detected in a codeword object. The method includes forming a first synchronized codeword object (SCO) having first and second encoded processed user data units and one or more sync patterns. The first SCO is one of T SCOs in a first SCO set. The first user data unit is one of T user data unit in a first user data unit set within the first SCO set and the second user data unit is one of T user data unit in a second user data unit set within the first SCO set, where T is the number of physical tracks on the tape to which data is written simultaneously. The first SCO set is written to a first position on magnetic tape and read the first SCO set after the data is written.

When an error is detected in one of the user data units, a second SCO is formed to include the user data unit set having the defective user data unit and, only if an error is not detected in a user data unit in the other user data unit set, to not include the other user data unit, the second SCO being one of T SCOs in a second SCO set. The second SCO set is then rewritten to a position on the tape later than the first position.

In some embodiments, the encoded processed user data units comprises m interleaved Reed-Solomon codewords (CWI-m) and an associated header. In some of those embodiments, m=4 or 8, although m may equal other numbers as well. In a further embodiment, the one or more sync patterns comprise a forward sync pattern before the first encoded processed user data unit, a re-sync pattern between the first and second user data units and a reverse sync pattern following the second user data unit.

Thus, the efficiency of incorporating longer user data units, such as double-length CWI-4s for example, in SCOs is preserved while reducing the penalty when data must be rewritten following the detection of an error.

BRIEF DESCRIPTION OF THE DRAWINGS

FIG. 2 illustrates the structure of a synchronized codeword object (SCO) containing two codeword interleaves (CWI) fields as defined by the LTO-4 standard;

FIG. 3A illustrates an SCO set with T=16 SCOs having the structure illustrated in FIG. 2, where T is the number of physical tracks on the tape;

DETAILED DESCRIPTION OF THE PREFERRED EMBODIMENT

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. A module of executable code could be a single instruction, or many instructions, and may even be distributed over several different code segments, among different programs, and across several memory devices Furthermore, the described features, structures, or characteristics of the invention may be combined in any suitable manner in one or more embodiments. In the following description, numerous specific details are provided, such as examples of programming, software modules, hardware modules, hardware circuits, etc., to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
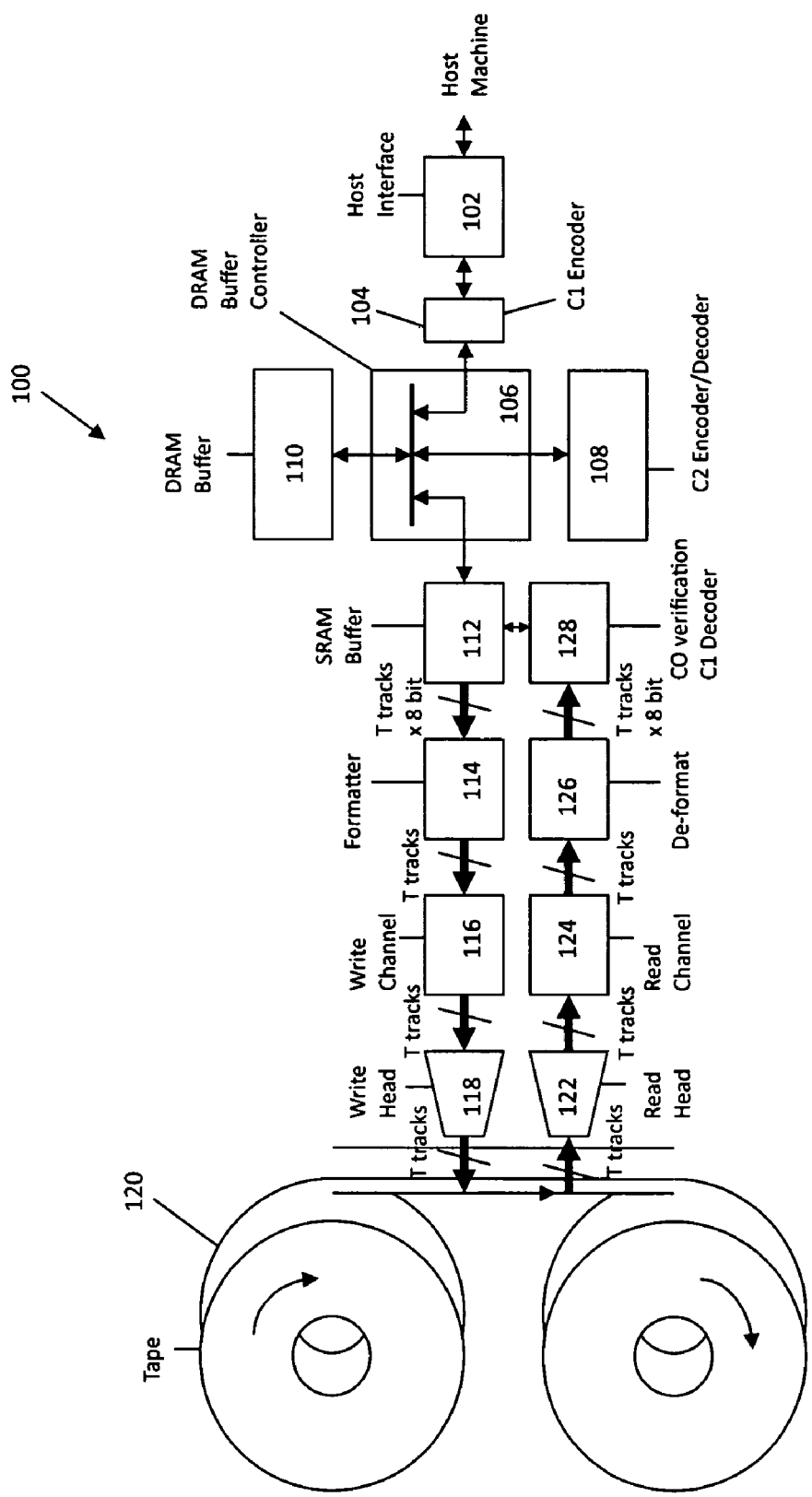
FIG. 1 is a block diagram of a magnetic tape drive with which the present invention may be implemented.

FIG. 1 is a high level block diagram of a data tape drive 100 in which the present invention may be incorporated. A stream of user data symbols, forming a data set to be recorded to magnetic tape, is transmitted from a host (not shown) to the drive 100 through a host interface 102. The data undergoes a first encoding in a C1 encoder 104, which may be a Reed-Solomon or other type of encoder. and passed to a DRAM buffer controller 106. The C1-encoded data undergoes a second encoding in a C2 encoder 108 and is stored in a DRAM buffer 110. The data is subsequently stored in an SRAM buffer 112 and formatted in a formatter 114 according to a predetermined standard. Formatted data is sent to a write channel and then to a write head 118 which records the data onto T physical tracks on the tape 120.

When the data is read back from the tape 120, a read head 122 detects the data and passes it to a read channel. The data is then processed in a de-formatter 126 to generate codeword objects (COs) and which are error checked and verified in a verifier 128. The data is then decoded and the resulting user data is sent to the requesting host.

Figure 3B:
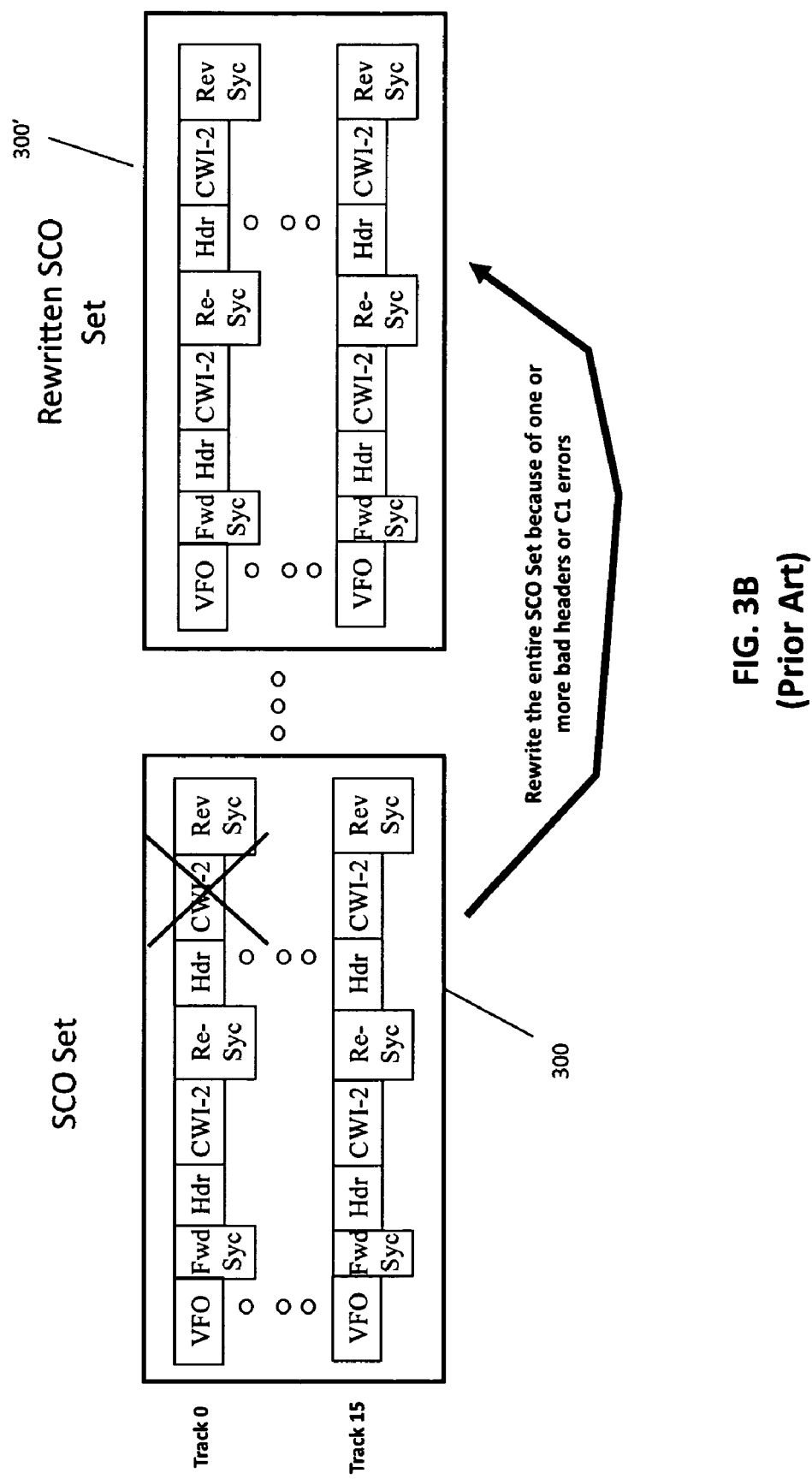
FIG. 3B illustrates the rewriting of an entire SCO set to a later position on the tape upon the detection of an error in the set.

FIG. 2 illustrates the structure of a synchronized codeword object (SCO) 200 as defined by the LTO-4 standard. The SCO includes a two-byte forward sync pattern 204A, a first ten-byte header 206A and a first 480-byte CWI-2 208A. Next is a four-byte resync pattern 204B followed by a second ten-byte header 206B and second 480-byte CWI-2 208B. A final two-byte sync pattern 204C completes the SCO. Also illustrated is a 32-byte VFO pattern 202 which technically is not part of the SCO standard. As illustrated in FIG. 3A, an SCO set 300 of, for example, T=16 SCOs, is written simultaneously to an equal number of physical tracks on the data tape 120. In the event that a defect is detected in the contents of one of the headers or one of the CWI-2 fields, the entire SCO set 300 is rewritten (300') at a later position farther down the tape 120 (see FIG. 3B).

Figure 4:
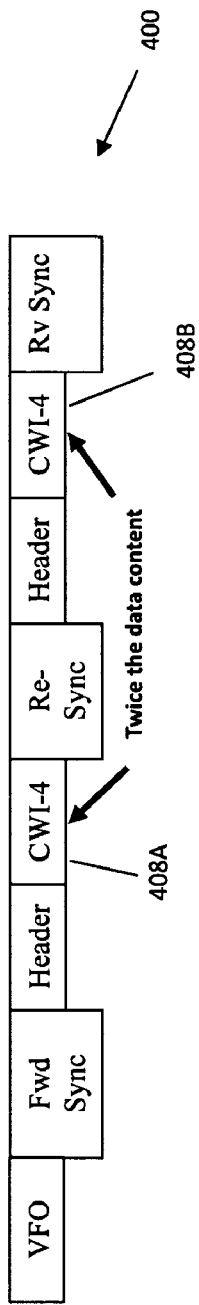
FIG. 4 illustrates the structure of a proposed future SCO having two double-length CWI-4s for improved efficiency.

Turning to FIG. 4, to improve data writing efficiency, the length of each CWI field in each SCO 400 is doubled from two CWI-2s of 480-bytes each 208A, 208B (FIG. 2) to two CWI-4s of 960-bytes each 408A, 408B. By increasing the amount of user data in each SCO, the relative amount of overhead, in the form of VFO, sync and header patterns, is reduced. TABLE 1 illustrates the gain in efficiency when user data is written to double-length CWIs where the efficiency is determined by dividing the number of customer bits by the total bits in the SCO. The rate-16/17 modulation-encoded 480-byte CWI-2s in the first column of TABLE 1 have a size of (480*8 bits)*(17/16)=4080 bits whereas the rate-16/17 modulation-encoded 960-byte CWI-4s in the second column of TABLE 1 have a size of (960*8 bits)*(17/16)=8160 bits. It will be appreciated that, although examples are provided herein using a rate-16/17 modulation encoder, other modulation encoders such as rate-32/33 modulation encoders can be used. In the case of rate-32/33 modulation encoders, the length of modulation-encoded 480-byte CWI-2s and 960-byte CWI-4s would be 3960 bits and 7920 bits, respectively. Furthermore, it will be appreciated that, although examples are provided herein using CWIs with four interleaves, CWIs may be formed with more than four interleaves, such as six, eight, etc. The present invention is not limited to use with CWI-4s and the term "CWI-m" may be used herein to refer to the more general case. More generally, the term "encoded processed user data unit" may be used to describe various user data structures, including (but not limited to) a modulation-encoded CWI-m with its associated header following data processing such as compression and optional encryption.

TABLE 1

| | Structure of FIG. 2 | Structure of FIG. 4 |
|---|---|---|
| VFO | 255 bits | 255 bits |
| Fwd Sync | 17 | 17 |
| Header | 85 | 85 |
| CWI-2/4 | 4,080 | 8,160 |
| Re-sync | 34 | 34 |
| Header | 85 | 85 |
| CWI-2/4 | 4,080 | 8,160 |
| Rev Sync | 17 | 17 |
| Total Bits | 8,653 | 16,813 |
| Customer Bits | 8,160 | 16,320 |
| Efficiency | 0.943026 | 0.970677 |
| Efficiency Gain | | 2.9% |

Figure 5:
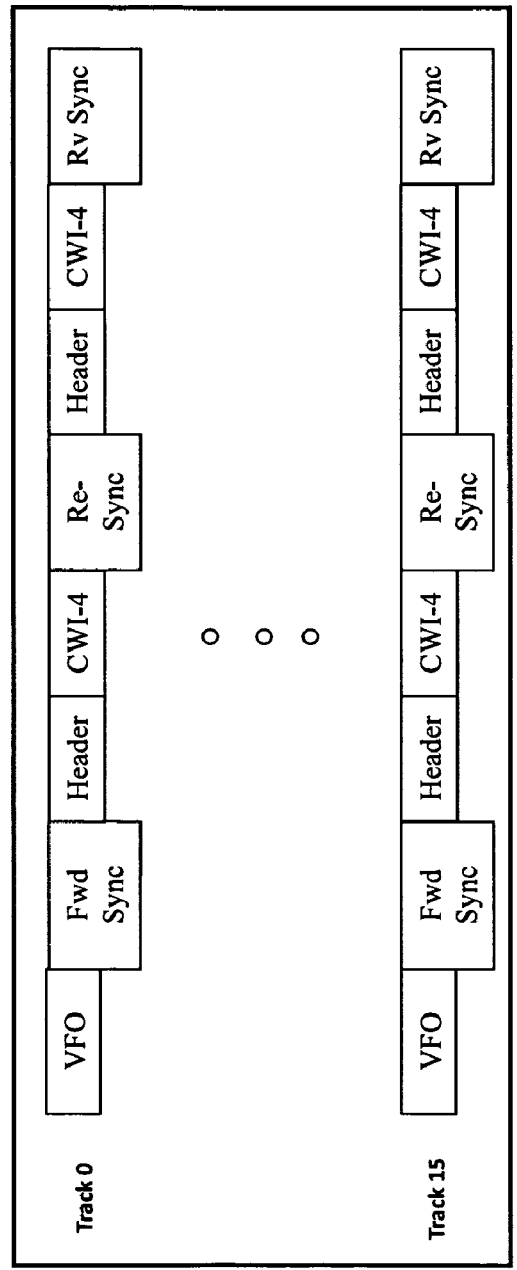
FIG. 5 illustrates an SCO set with T=16 of the proposed SCOs having the structure illustrated in FIG. 4.

FIG. 5 illustrates an SCO set containing one double-length SCO for each of T=16 physical tracks on the tape. (It will be understood that, due to the presence of sync and header patterns, the length of the SCO containing two CWI-4s is somewhat less than "double-length" but can be said to be "effectively" or "essentially" double that of a conventional SCO containing two CWI-2s.)

Figure 6:
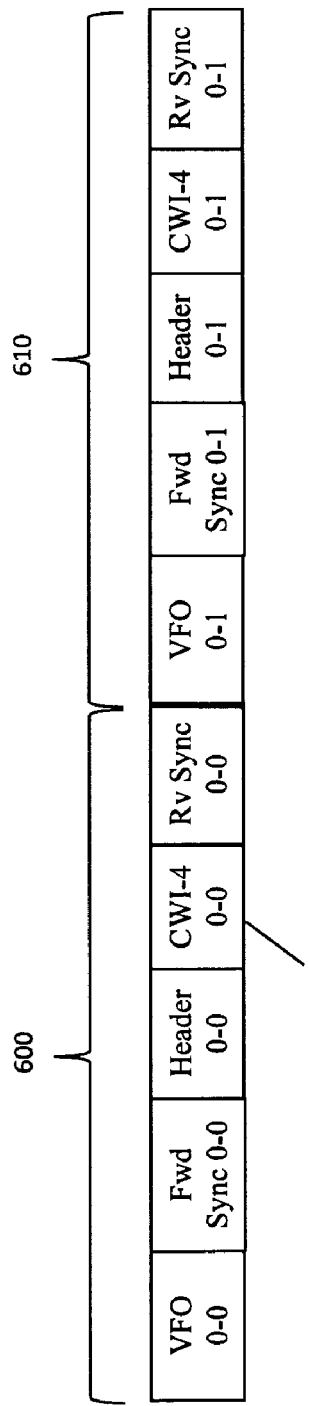
FIG. 6 illustrates the structure of a proposed SCO having a single double-length CWI-4.
Figure 7:
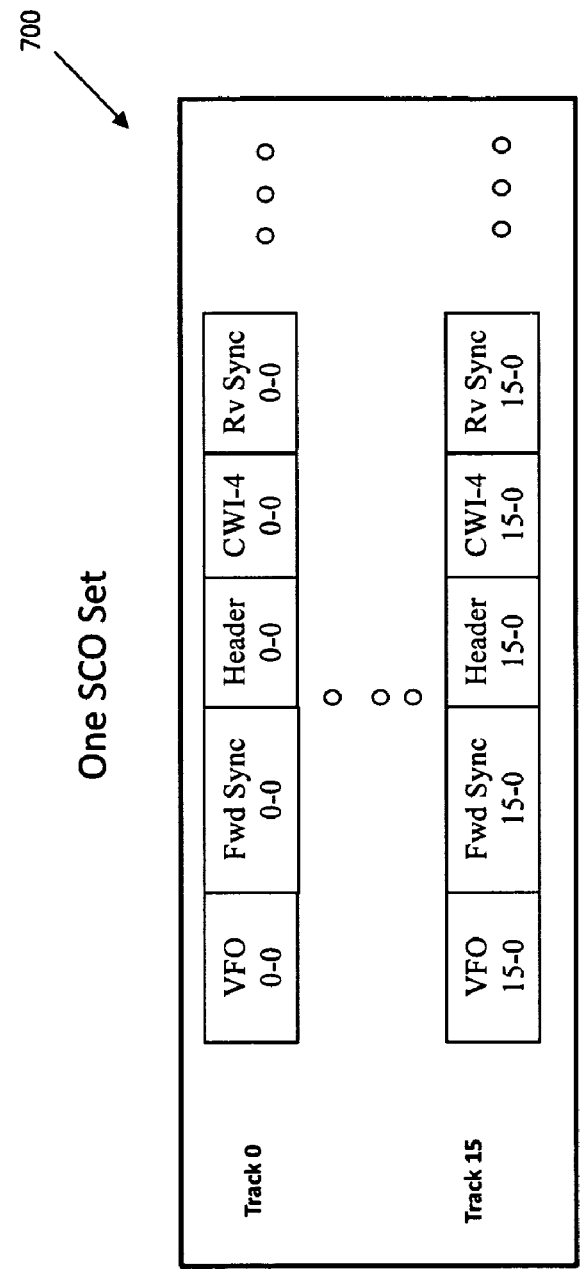
FIG. 7 illustrates an SCO set with T=16 of the SCOs having the proposed structure illustrated in FIG. 6.

FIG. 6 illustrates the structure of a proposed SCO 600, having a single double-length CWI-4 602, while FIG. 7 illustrates an SCO set 700 of the proposed single double-length CWI-4 SCOs with T=16. The length of the SCO 600 is approximately one-half the length of the SCO of FIG. 4. As before, when an error is detected in an SCO, the entire SCO set is rewritten at a later position on the tape. However, the rewritten SCO set only requires approximately one-half the space on the tape as a rewritten SCO set of FIG. 5. Shown in FIG. 6 are two SCOs 600 and 610 representing the first two SCOs of a first of T tracks. Thus, each field in the first SCO 600 is labeled 0-0 and each field in the second SCO 610 is labeled 0-1. Similarly, each field in the 16$^{th}$ SCO is labeled 15-0.

While rewriting an SCO 600 of FIG. 6 requires only approximately one-half the space on the tape as a rewritten SCO of FIG. 4, it requires an extra VFO pattern for the same amount of user data (the extra reverse and forward sync patterns are offset by the longer re-sync pattern of the proposed future structure). TABLE 2 demonstrates that such an SCO is less efficient than the SCO of FIG. 4 although still somewhat more efficient than the SCO of LTO-4 (FIG. 2).

TABLE 2

|  | Structure of FIG. 4 | Structure of FIG. 6 |
|---|---|---|
| VFO | 255 bits | 255 bits |
| Fwd Sync | 17 | 17 |
| Header | 85 | 85 |
| CWI-4 | 8,160 | 8,160 |
| Re-sync | 34 | — |
| Rev Sync | — | 17 |
| VFO | — | 255 |
| Fwd Sync | — | 17 |
| Header | 85 | 85 |
| CWI-2/4 | 8,160 | 8,160 |
| Rev Sync | 17 | 17 |
| Total Bits | 16,813 | 17,068 |
| Customer Bits | 16,320 | 16,320 |
| Efficiency | 0.970677 | 0.9561753 |
| Efficiency Gain |  | −1.4% |

Figure 8A:
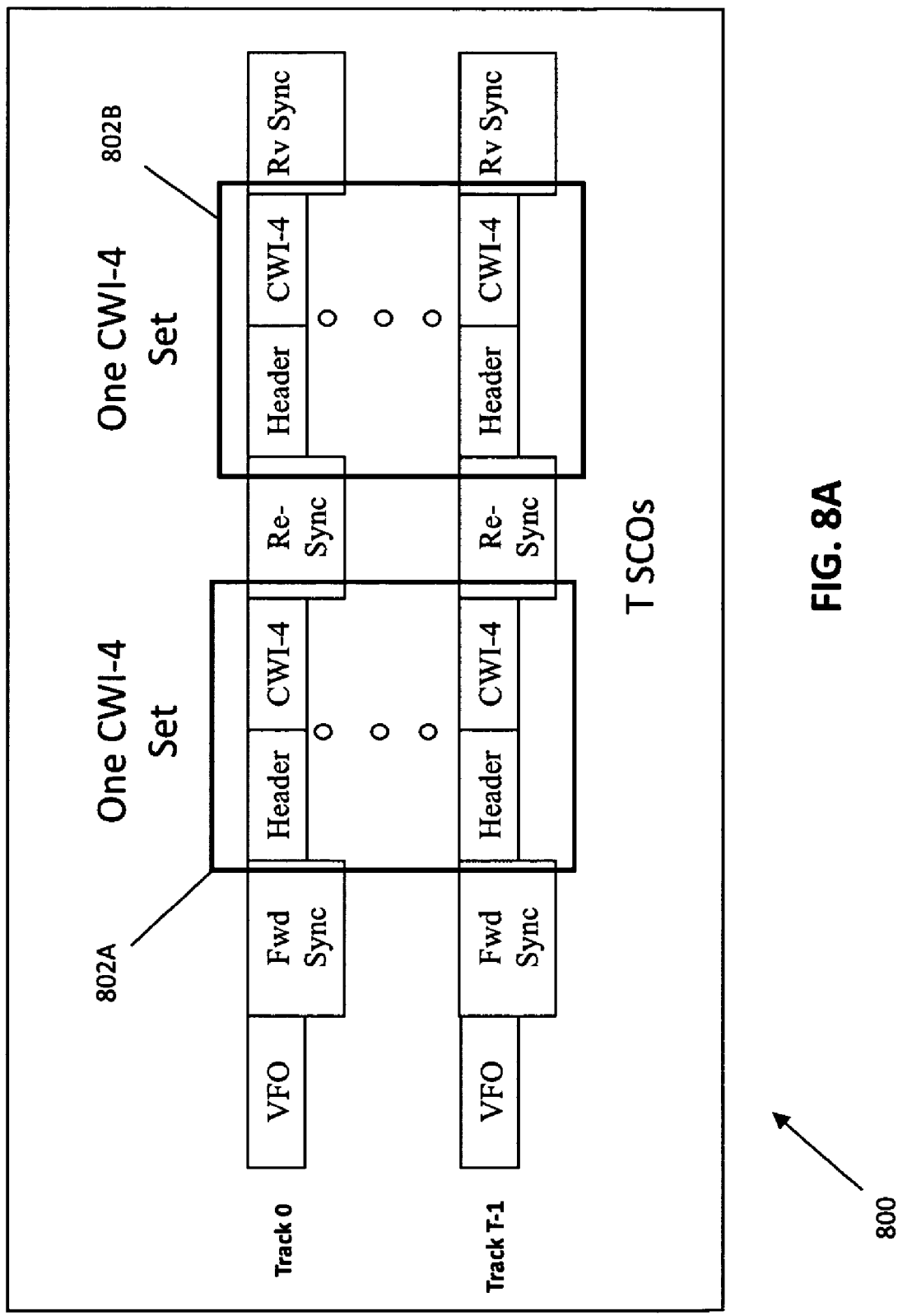
FIG. 8A illustrates the structure of an SCO set of the present invention.
Figure 8B:
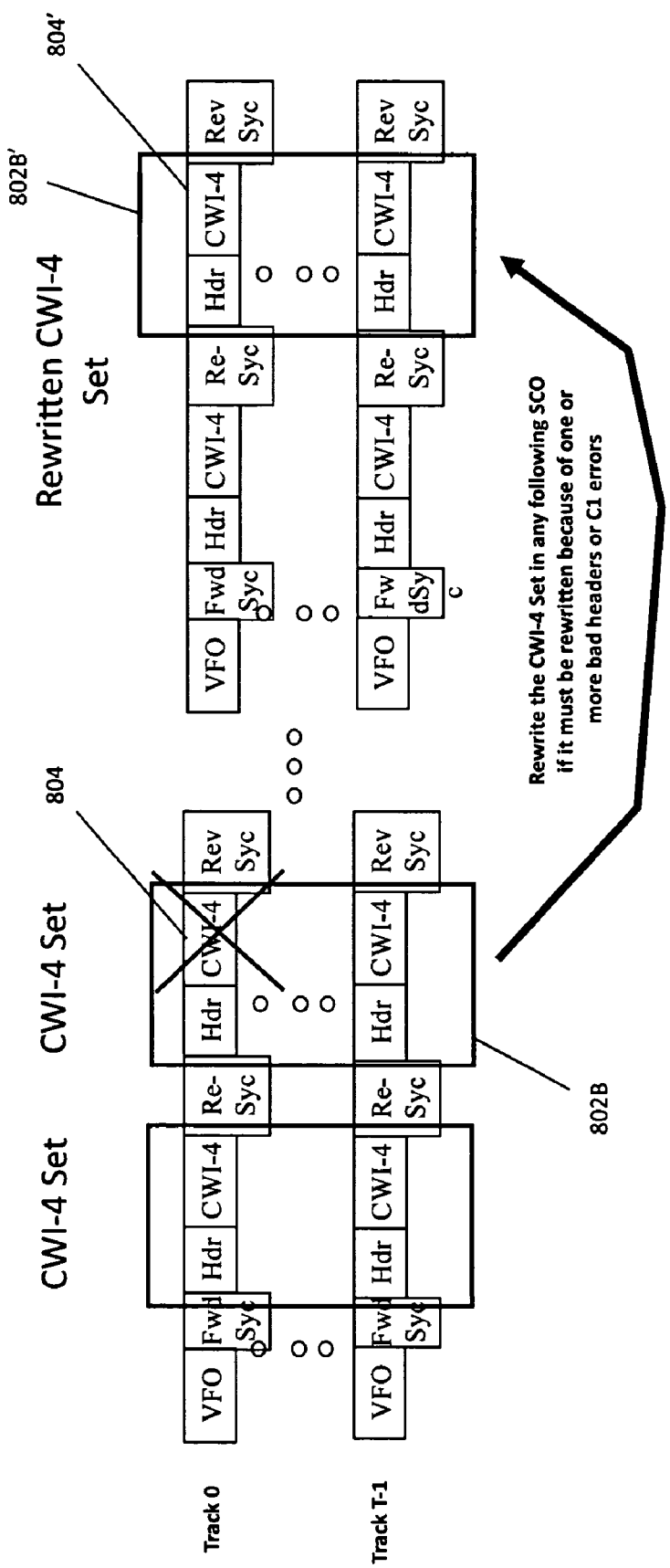
FIG. 8B illustrates the rewriting of only a CWI-4 set to a later position on the tape upon detection of a defect in one CWI-4.

FIG. 8A illustrates an SCO set 800 of the present invention in which the minimum unit to be rewritten when a defect is detected is a CWI-m set (with m=4 in the FIGs.). not the full SCO set. Thus, each SCO set 800 is configured with two CWI-m=4 sets 802A and 802B. When a defect is detected, only the CWI-4S and their associated headers are rewritten. For example, in FIG. 8B a detect has been detected in a CWI-4 804, part of the CWI-4 set 802B. Rather than rewrite the entire SCO set 800 (all of the CWI-4s, all of the headers and all of the sync patterns), only the CWI-4 set 802B in which the defective CWI-4 804 is located is rewritten (802B') in a SCO set farther down the tape. It is not necessary that this CWI-4 set be rewritten next to, or even close to, other related CWI-4 sets. As illustrated, the defective CWI-4 804 is rewritten (804') in an SCO set following an unrelated CWI-4 set 810. If a write operation would result in an incomplete SCO set at the end of a data set, any CWI-4 set may be rewritten to complete the SCO set. Consequently, the full gain in efficiency from using CWI-4 data fields is retained. In addition, rewriting shorter objects (CWI-4 sets instead of full SCO sets) will tend to reduce the likelihood of another error event, thereby further increasing efficiency. It will again be appreciated that m is not limited to 4 and that T is not limited to 16 tracks.

It is important to note that while the present invention has been described in the context of a fully functioning data processing system, those of ordinary skill in the art will appreciate that the processes of the present invention are capable of being distributed in the form of a computer storage readable medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for rewriting data to magnetic tape or a method for deploying computing infrastructure comprising integrating computer readable code into a computing system for rewriting data to magnetic tape

What is claimed is:

1. A method for rewriting data to magnetic tape when an error is detected in a codeword object, comprising:
    forming a first synchronized codeword object (SCO) having first and second encoded processed user data units and one or more sync patterns, the first SCO being one of T SCOs in a first SCO set, the first user data unit being one of T user data unit in a first user data unit set within the first SCO set and the second user data unit being one of T user data unit in a second user data unit set within the first SCO set, where T is the number of physical tracks on the tape to which data is written simultaneously;
    writing the first SCO set to a first position on magnetic tape;
    reading the first SCO set immediately after the data is written;
    detecting an error in one of the user data units;
    forming a second SCO to include the user data unit set having the defective user data unit and, only if an error is not detected in a user data unit in the other user data unit set, to not include the other user data unit, the second SCO being one of T SCOs in a second SCO set; and
    rewriting the second SCO set to a position on the tape later than the first position.

2. The method of claim 1, wherein each user data unit comprises modulation-encoded interleaved modulation-encoded Reed-Solomon codewords (CWI-m) and an associated header.

3. The method of claim 2, wherein m=4.

4. The method of claim 2, wherein m=8.

5. The method of claim 2, wherein the Reed-Solomon codewords are 240 bytes long.

6. The method of claim 2, wherein the interleaved modulation-encoded Reed-Solomon codewords are encoded with a rate-32/33 modulation encoder.

7. The method of claim 2, wherein each user data unit comprises 7920 bits.

8. The method of claim 1, wherein the one or more sync patterns comprise a forward sync pattern before the first encoded processed user data unit, a re-sync pattern between the first and second user data units and a reverse sync pattern following the second user data unit.

9. A data tape drive for writing data to T tracks of a tape simultaneously, comprising:
    a host interface through which a stream of user data symbols comprising a data set is received;
    a C1 encoder coupled to an output of the host interface to generate C1-encoded data;
    a C2 encoder coupled to an output of the C1 encoder to generate C1/C2-encoded data;
    a formatter coupled to an output of the C2 encoded to format the C1/C2-encoded data according to a predetermined standard;
    a write channel, including a write head, for writing the formatted data simultaneously to T physical tracks on the tape;
    a read channel, including a read head, for reading the data from the tape immediately after it has been written;
    a deformatter to generate codeword objects from the data read from the tape, the codeword objects including a first synchronized codeword object (SCO) having first and second encoded processed user data units and one or more sync patterns, the first SCO being one of T SCOs in a first SCO set, the first user data unit being one of T user data units in a first user data unit set within the first SCO set and the second user data unit being one of T user data units in a second user data unit set within the first SCO set; and a CO verifier operable to:
- detect an error in one of the user data units;
- direct that the formatter form a second SCO to include the user data unit set having the defective user data unit and, only if an error is not detected in a user data unit in the other user data unit set, to not include the other user data unit, the second SCO being one of T SCOs in a second SCO set; and
- direct that the second SCO set be written to a position on the tape later than the first position.

10. The data tape drive of claim 9, wherein each user data unit comprises modulation-encoded interleaved Reed-Solomon codewords (CWI-m) and an associated header.

11. The data tape drive of claim 10, wherein m=4.

12. The data tape drive of claim 10, wherein m=8.

13. The data tape drive of claim 10, wherein the Reed-Solomon codewords are 240 bytes long.

14. The data tape drive of claim 10, wherein the interleaved modulation-encoded Reed-Solomon codewords are encoded with a rate-32/33 modulation encoder.

15. The data tape drive of claim 10, wherein each user data unit comprises 7920 bits.

16. The data tape drive of claim 9, wherein the one or more sync patterns comprise a forward sync pattern before the first encoded processed user data unit, a re-sync pattern between the first and second user data units and a reverse sync pattern following the second user data unit.

17. A computer program product of a computer readable medium usable with a programmable computer, the computer program product having computer-readable code embodied therein for rewriting data to magnetic tape, the computer-readable code comprising instructions for:
- forming a first synchronized codeword object (SCO) having first and second encoded processed user data units and one or more sync patterns, the first SCO being one of T SCOs in a first SCO set, the first user data unit being one of T user data unit in a first user data unit set within the first SCO set and the second user data unit being one of T user data unit in a second user data unit set within the first SCO set, where T is the number of physical tracks on the tape to which data is written simultaneously;
- writing the first SCO set to a first position on magnetic tape;
- reading the first SCO set immediately after the data is written;
- detecting an error in one of the user data units;
- forming a second SCO to include the user data unit set having the defective user data unit and, only if an error is not detected in a user data unit in the other user data unit set, to not include the other user data unit, the second SCO being one of T SCOs in a second SCO set; and
- rewriting the second SCO set to a position on the tape later than the first position.

18. The computer program product of claim 17, wherein each user data unit comprises modulation-encoded interleaved Reed-Solomon codewords (CWI-m) and an associated header.

19. The computer program product of claim 18, wherein m=4.

20. The computer program product of claim 18, wherein m=8.

21. The computer program product of claim 18, wherein the Reed-Solomon codewords are 240 bytes long.

22. The computer program product of claim 18, wherein the interleaved modulation-encoded Reed-Solomon codewords are encoded with a rate-32/33 modulation encoder.

23. computer program product of claim 18, wherein each user data unit comprises 7920 bits.

24. The computer program product of claim 17, wherein the one or more sync patterns comprise a forward sync pattern before the first encoded processed user data unit, a re-sync pattern between the first and second user data units and a reverse sync pattern following the second user data unit.

25. A method for deploying computing infrastructure comprising integrating computer readable code into a computing system for rewriting data to magnetic tape, comprising:
- forming a first synchronized codeword object (SCO) having first and second encoded processed user data units and one or more sync patterns, the first SCO being one of T SCOs in a first SCO set, the first user data unit being one of T user data unit in a first user data unit set within the first SCO set and the second user data unit being one of T user data unit in a second user data unit set within the first SCO set, where T is the number of physical tracks on the tape to which data is written simultaneously;
- writing the first SCO set to a first position on magnetic tape;
- reading the first SCO set immediately after the data is written;
- detecting an error in one of the user data units;
- forming a second SCO to include the user data unit set having the defective user data unit and, only if an error is not detected in a user data unit in the other user data unit set, to not include the other user data unit, the second SCO being one of T SCOs in a second SCO set; and
- rewriting the second SCO set to a position on the tape later than the first position.

26. The method of claim 25, wherein each user data unit comprises modulation-encoded interleaved Reed-Solomon codewords (CWI-m) and an associated header.

27. The method of claim 26, wherein m=4.

28. The method of claim 26, wherein m=8.

29. The method of claim 26, wherein the Reed-Solomon codewords are 240 bytes long.

30. The method of claim 26, wherein the interleaved modulation-encoded Reed-Solomon codewords are encoded with a rate-32/33 modulation encoder.

31. The method of claim 26, wherein each user data unit comprises 7920 bits.

32. The method of claim 25, wherein the one or more sync patterns comprise a forward sync pattern before the first encoded processed user data unit, a re-sync pattern between the first and second user data units and a reverse sync pattern following the second user data unit.

* * * * *